(12) United States Patent
Chang

(10) Patent No.: US 8,690,457 B2
(45) Date of Patent: Apr. 8, 2014

(54) OPTICAL CONNECTOR

(76) Inventor: Nai-Chien Chang, New Taipei (TW)

( * ) Notice: Subject to any disclaimer, the term of this patent is extended or adjusted under 35 U.S.C. 154(b) by 165 days.

(21) Appl. No.: 13/486,943

(22) Filed: Jun. 1, 2012

(65) Prior Publication Data

US 2013/0022319 A1  Jan. 24, 2013

(30) Foreign Application Priority Data

Jul. 22, 2011  (TW) .............................. 100213600 A

(51) Int. Cl.
*G02B 6/36* (2006.01)
(52) U.S. Cl.
USPC ............................................. 385/89; 385/92
(58) Field of Classification Search
USPC ...................................................... 385/89, 92
See application file for complete search history.

(56) References Cited

U.S. PATENT DOCUMENTS

2011/0311187 A1* 12/2011 Wang et al. ..................... 385/78

* cited by examiner

*Primary Examiner* — Michael Stahl
*Assistant Examiner* — Kajli Prince
(74) *Attorney, Agent, or Firm* — Chun-Ming Shih; HDLS IPR Services

(57) ABSTRACT

An optical connector has a base, the base includes a least one first slot thereon, and the base further includes at least one optical component, a circuit board, a signal transforming integrated circuit (IC), and a plurality of connecting terminals therein. The circuit board electrically connects to the optical component, the signal transforming IC, and the connecting terminals. The first slot is used to connect with an external wire, an optical receiving portion of the optical component receives optical signal which is sent from the wire, and the received optical signal is sent to the signal transforming IC to transform the optical signal into electronic signal. Finally, optical connector sends the transformed electronic signal externally through the connecting terminals. Therefore, optical signal transmission facilitates the optical connector to upgrade transmitting rate, and compatibility of the optical connector can be ensured by transforming the optical signal into electronic signal.

10 Claims, 8 Drawing Sheets

OPTICAL CONNECTOR

BACKGROUND OF THE INVENTION

1. Field of the Invention

The present disclosure relates to an optical connector, in particularly to an optical connector capable of receiving optical signal from external transmission and transforming the optical signal into electronic signal and transmitting outwardly.

2. Description of Related Art

As the electronic industry growing rapidly, nowadays various kinds of electronic devices are used in our daily lives. For inputting commands to control the electronic devices, or transmitting information from one electronic device to another, at least one connector is arranged on a circuit board of the electronic device.

For example, a personal computer usually has a plurality of connectors such as universal serial bus (USB) connectors, external serial advance technology attachment (e-SATA) connectors, RJ-45 connectors, high definition multimedia interface (HDMI) connectors. With the connectors, the personal computer is capable of communicating with external controlling devices and receiving controlling commands, or the personal computer can be connected to another electronic device for mutually transmitting information.

However, as technology keeps improving, information transmission rate required by users is getting higher and higher. The traditional transmission rate of coppers wire can not meet the requirement any more. Therefore, one or more optical fiber wires with optical connector have been adopted by several kinds of novel transmission technologies for increasing the transmission rate. Moreover, an optical connector and a corresponding transmission line are used for replacing conventional transmission connector and transmitting information only through the optical connector. In practice, future connector apparatus adopting optical connector and optical fiber wire for transmitting various format signals may have a similar look of a conventional connector.

However, the above mentioned optical fiber wire can not be directly connected to a circuit board of a conventional electronic device for transforming the received optical signal into electronic signal. Consequently, manufacturer of the electronic device will have to pay additional cost, and different kinds of signal transforming integrated circuit in different electronic devices may cause the problem that the connector can not be adapted to the mainboard.

SUMMARY OF THE INVENTION

The main objective of the present invention is to provide an optical connector for electrically connected to a mainboard of an external electronic device, the optical connector is capable of receiving optical signal from the external wire and transforming it into electronic signal and transmitting it to the mainboard.

For achieving the above objective, the optical connector of the present invention has a base. The base had at least one first slot, and at least one optical component, a circuit board, a signal transforming integrated circuit and a plurality of connecting terminals are arranged inside the base. The circuit board is electrically connected to the optical component, the signal transforming integrated circuit and a plurality of connecting terminals. The first slot is used for connecting the external wire. The optical receiving portion of the optical component can receive the optical signal and transform it into electronic signal by the signal transforming integrated circuit and then transmit it through the connecting terminals.

In comparison to the conventional technology, the optical connector is connected with the external wire and transmits optical signal. The optical connector proceeds the optoelectronic transforming procedure and transmits the transformed electronic signal to the mainboard of the external electronic device. Therefore, mainboard can receive any type of optical signal and improves the convenience of adopting optical connector on the mainboard of the electronic device.

Moreover, current connector and transmission line are added into optical fiber circuit on the original terminal structure for improving the transmission speed. Or even the original terminals are completely replaced by optical fiber for transmitting information. In the optical connector of the present invention, the number of the connecting terminals connected to the mainboard corresponds to the format of the wire inserted to the optical connector. The mainboard can receives corresponding electronic signal through correspondingly connecting terminals from optical signals.

DETAILED DESCRIPTION OF THE INVENTION

A detailed description of the present invention will be made with reference to the accompanying drawings.

Figure 1:
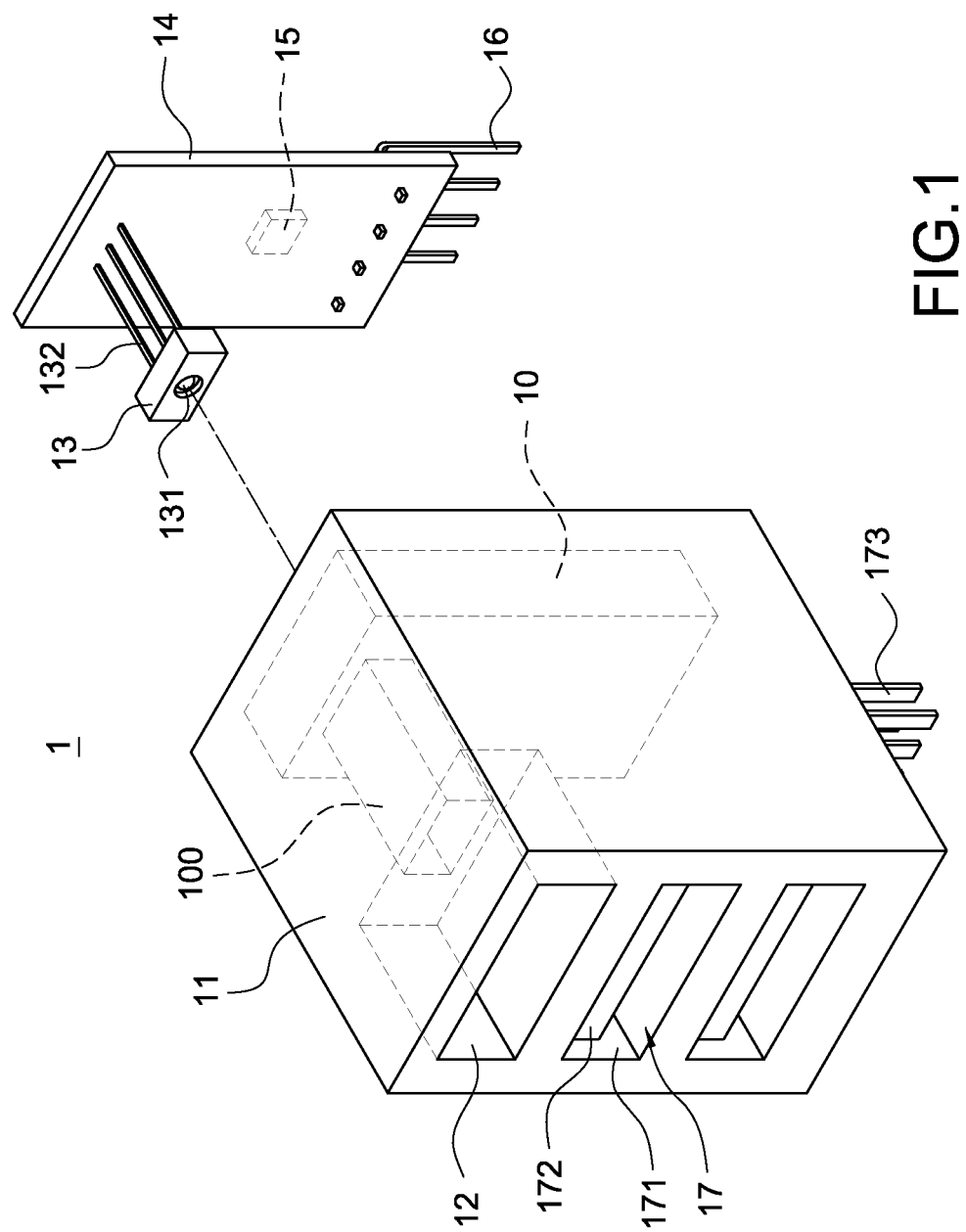
FIG. 1 is a perspective view according to the first embodiment of the present invention.
Figure 2:
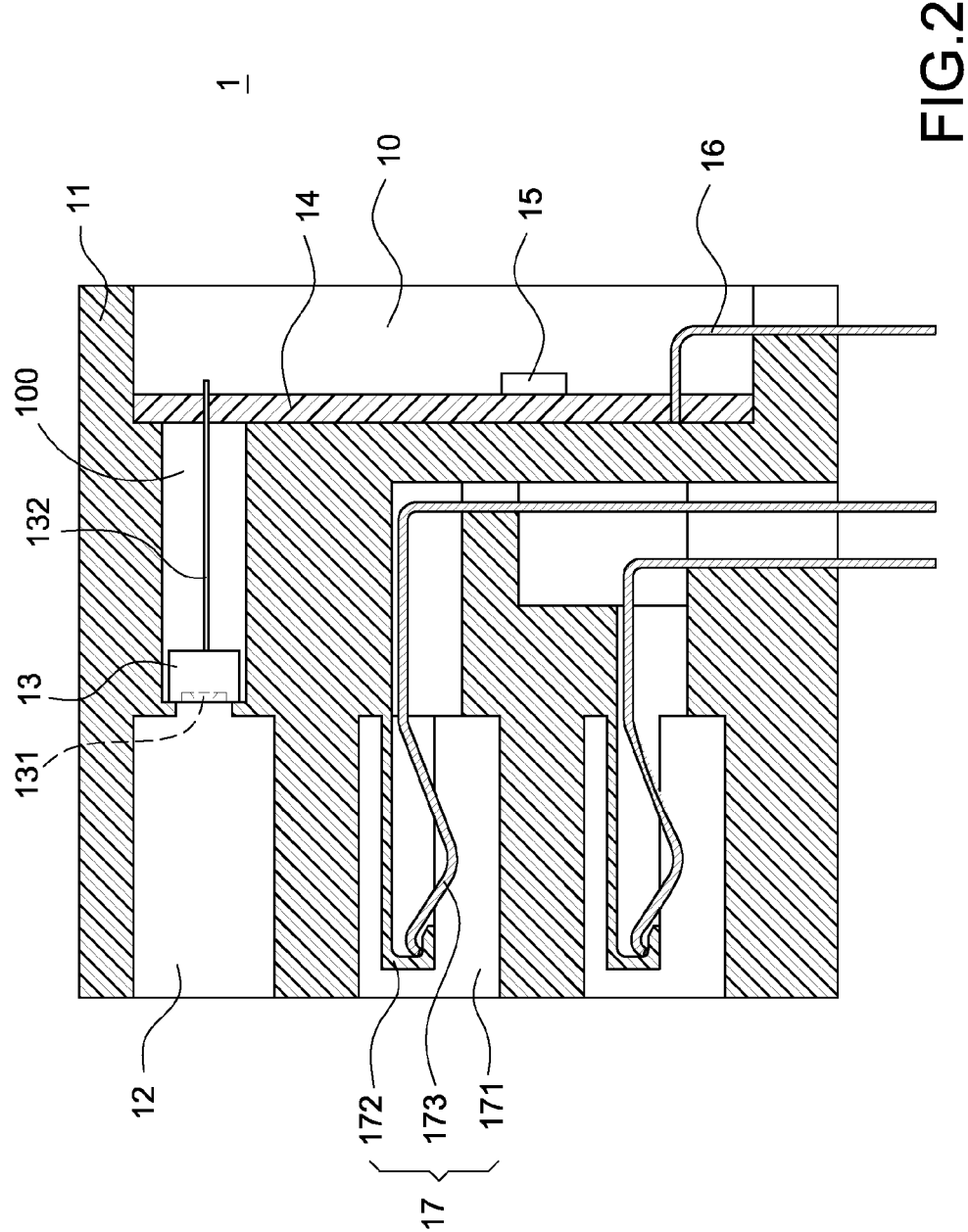
FIG. 2 is a sectional view according to the first embodiment of the present invention.
Figure 3:
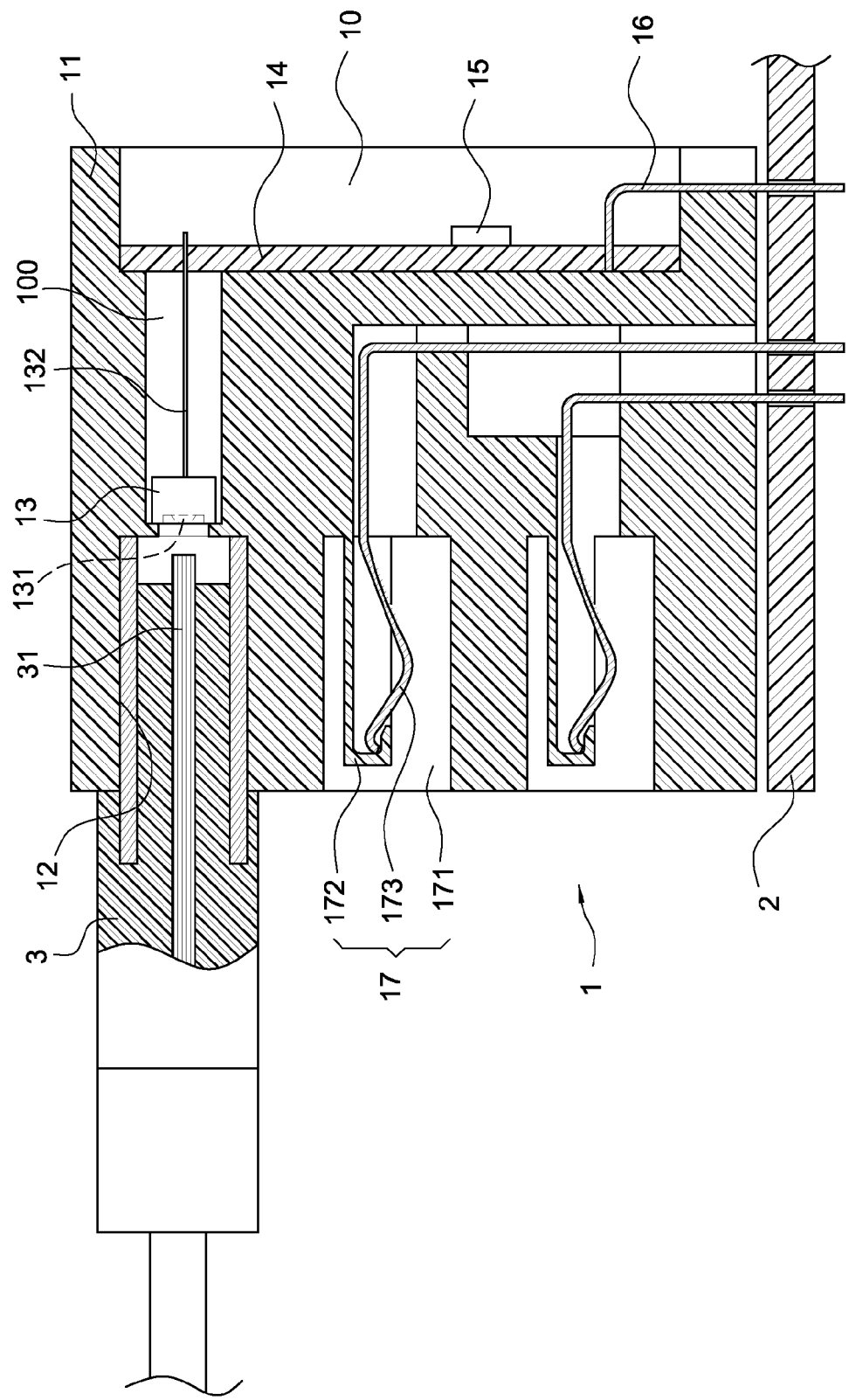
FIG. 3 is a schematic view according to the first embodiment of the present invention.

FIG. 1, FIG. 2 and FIG. 3 are respectively a perspective view, a sectional view and a schematic view of an optical connector according to the first embodiment of the present invention. As illustrated therein, the optical connector 1 mainly includes a base 11, an optical component 13, a circuit board 14, a signal transforming integrated circuit 15 and a plurality of connecting terminals 16. A receiving space 10 is defined inside the base 11 for accommodating the optical component 13, the circuit board 14, the signal transforming integrated circuit 15 and the connecting terminals 16. At least one first slot 12 is formed on a front surface of the base 11. A tunnel 100 is formed therein for communicating the receiving space 10 and the first slot 12.

The optical component 13 mainly has an optical receiving portion 131 and a plurality of welding terminals 132. The optical component 13 is welded to the circuit board 14 through the welding terminals 132. The optical receiving portion 131 is located corresponding to the tunnel 100. Therefore, when the external wire 3 is connected to the first slot 12 of the optical connector 1, the optical receiving portion 131 of the optical component 13 receives optical signals from the wire 3.

The signal transforming integrated circuit 15 is electrically connected to the circuit board 14 for receiving the optical signal received by the optical component 13 and transforming it into an electronic signal in a specific format. The specific format is determined according to the format of the wire 3. For example, if a universal serial bus (USB) transmission line with an optical connector 31 is added into the wire 3, the specific format is USB and the signal transforming integrated circuit 15 can transform the received optical signal into an electronic signal in USB format.

One ends of the connecting terminals 16 are respectively electrically connected or welded to the circuit board 14. And the other ends of the connecting terminals 16 protrude out from the base 11. The optical connector 1 is electrically connected to a mainboard 2 of an external electronic device (not shown). The optical connector 1 can transmit the transformed electronic signal to the mainboard 2 through the connecting terminals 16. Therefore, the signal transmitted from the wire 3 is still an optical signal and the signal received by the mainboard 2 is still an electronic signal, the mainboard 2 does not need the functions of transforming and operating and the convenience of the optical connector 1 is hugely improved. Therefore, a conventional mainboard can directly adopt the optical connector 1 without changing the design of electrical circuit or adding an integrated circuit.

It should be mentioned that the shape of the first slot 12 is determined according to the wire 3 to be inserted to the first slot 12. The number of the connecting terminals 16 is determined according to the format of the wire 3. For example, as FIG. 1 shows, the shape of the first slot 12 corresponds to the shape of the USB transmission interface, and the first slot 12 can be inserted with a wire 3 in USB format. In this embodiment, the wire 3 is a USB transmission line having the optical connector 31 therein. The signal transforming integrated circuit 15 can transform the received optical signal into an electronic signal in USB format. The four connecting terminals 16 correspond to the four terminals of the USB format. By counting the number of the connecting terminals 16, the mainboard 2 can recognize the transformed signal a USB format signal.

In this embodiment, at least one electronic connector 17 can be arranged below the first slot 12, the optical connector 1 can be a staked connector capable of receiving optical signal as well as electronic signal.

More specifically, the optical connector 1 mainly has a second slot 171 formed below the first slot 12. The second slot 171 has a tongue portion 172 therein and a plurality of conductive terminals 173. An electrical connector 17 is constituted of the second slot 171, the tongue portion 172 and the conductive terminals 173. One ends of the conductive terminals 173 are arranged on the tongue portion 172 for electrically connected to the external transmission line (not shown) connected to the electronic connector 17. The other ends of the conductive terminals 173 protrude out from the base 11 and electrically connected to the mainboard 2. The number of the electronic connectors 17 can be plural. The number in FIG. 1 is two for example, and not limited thereto.

In this embodiment, the format of the electronic connector 17 is a USB connector for example. In practical use, the electronic connector 17 can be replaced by an external serial advance technology attachment (eSATA) connector, or a high definition multimedia interface (HDMI), and not limited thereto.

Figure 4:
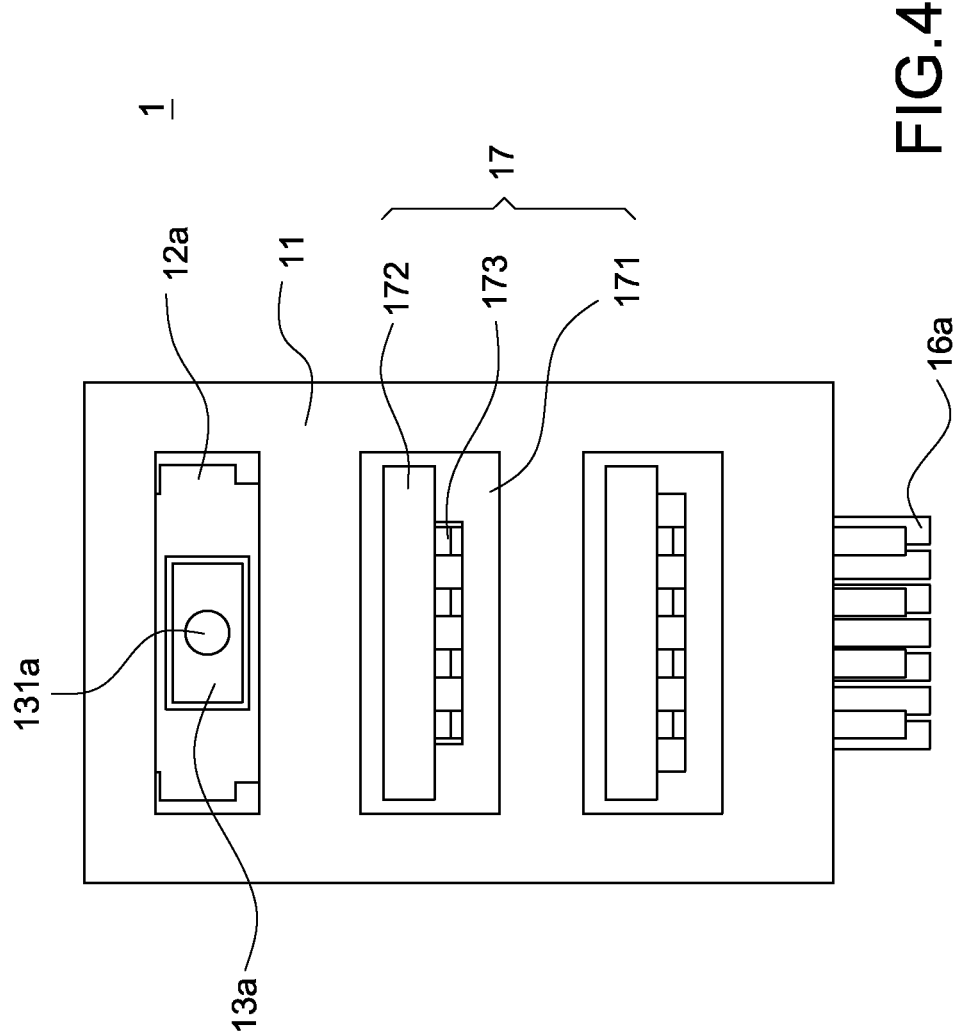
FIG. 4 is a front view according to the second embodiment of the present invention.
Figure 5:
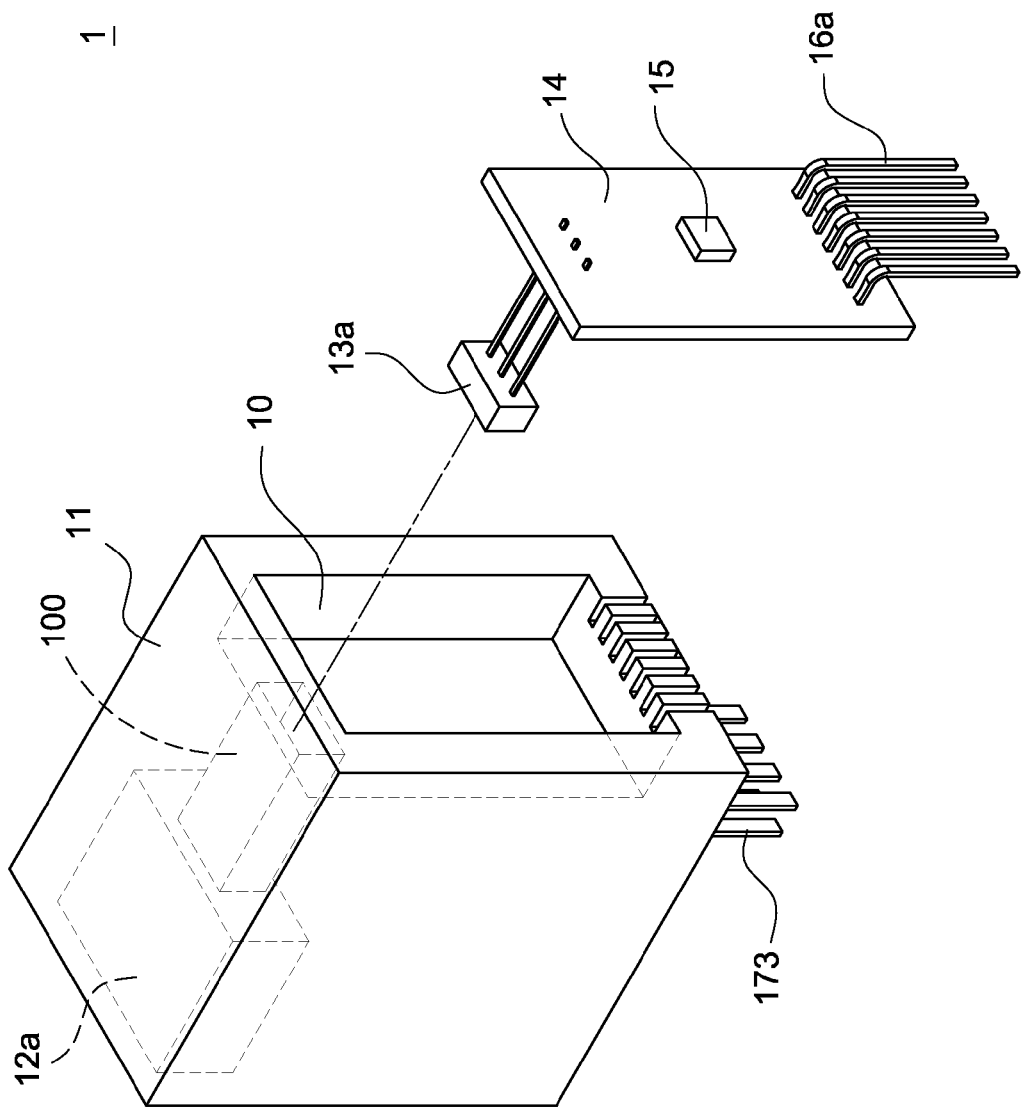
FIG. 5 is a rear view according to the second embodiment of the present invention.

FIG. 4 and FIG. 5 are respectively a front view and a rear view of according to the second embodiment of the present invention. The optical connector 1 may also has a first slot 12*a* on the front surface of the base 11. An optical component 13*a*, the circuit board 14, the signal transforming integrated circuit 15 and the connecting terminals 16*a* are arranged in the receiving space 10.

As FIG. 4 shows, the shape of the first slot 12*a* corresponds to the shape of the eSATA transmission interface. The first slot 12*a* can be inserted with a wire in eSATA format. In this embodiment, the wire is an eSATA transmission line having an optical connector therein. The signal transforming integrated circuit 15 can transform the optical signal received from the optical receiving portion 131*a* of the optical component 13*a* into an electronic signal in eSATA format. The number of the connecting terminals 16*a* is seven, which corresponds to the seven terminals of eSATA format.

For more example, the shape of the first slot 12*a* can correspond to the shape of HDMI transmission interface. The first slot 12*a* can be inserted with a wire of HDMI format. Besides, the optical connector 1 can transform the optical signal received from the optical receiving portion 131*a* into a HDMI format signal by the signal transforming integrated circuit 15. The number of the connecting terminals 16*a* can be nineteen, which corresponds to the nineteen terminals of the HDMI format.

Figure 6:
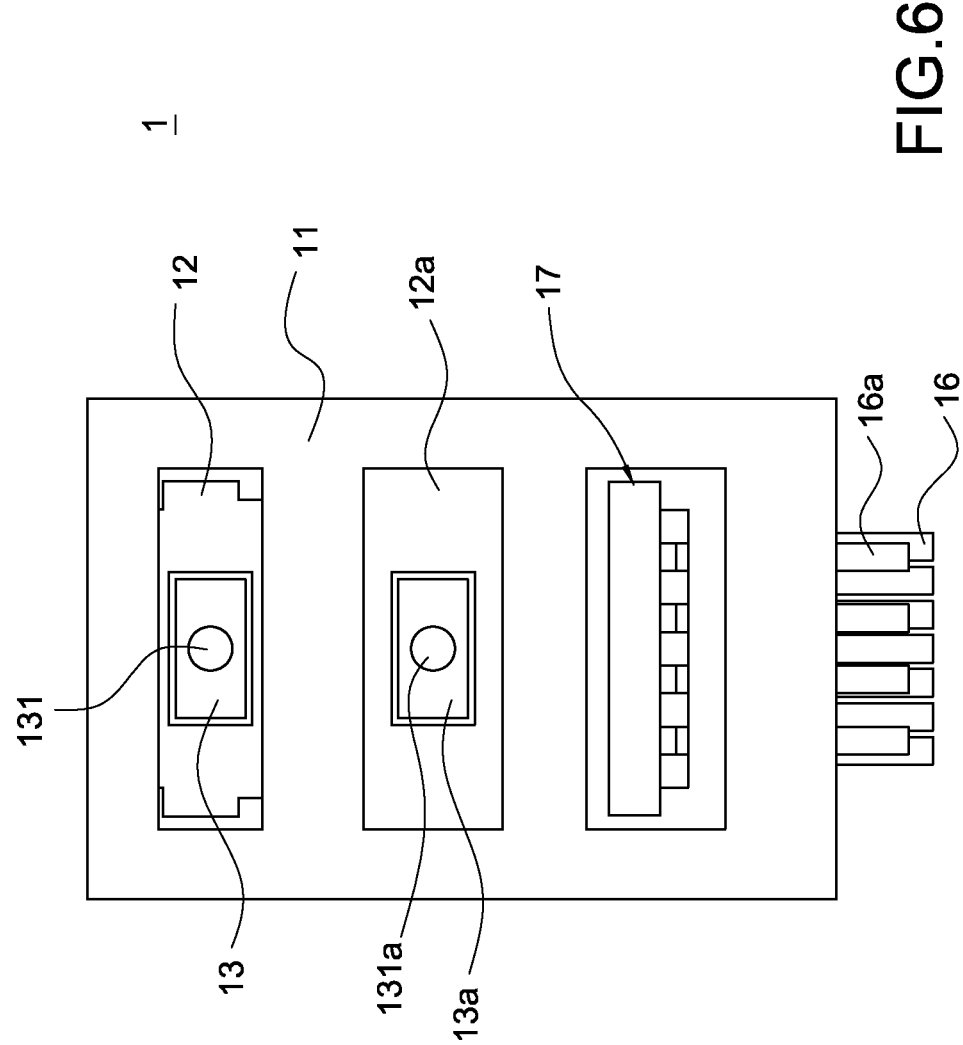
FIG. 6 is a front view according to the third embodiment of the present invention.
Figure 7:
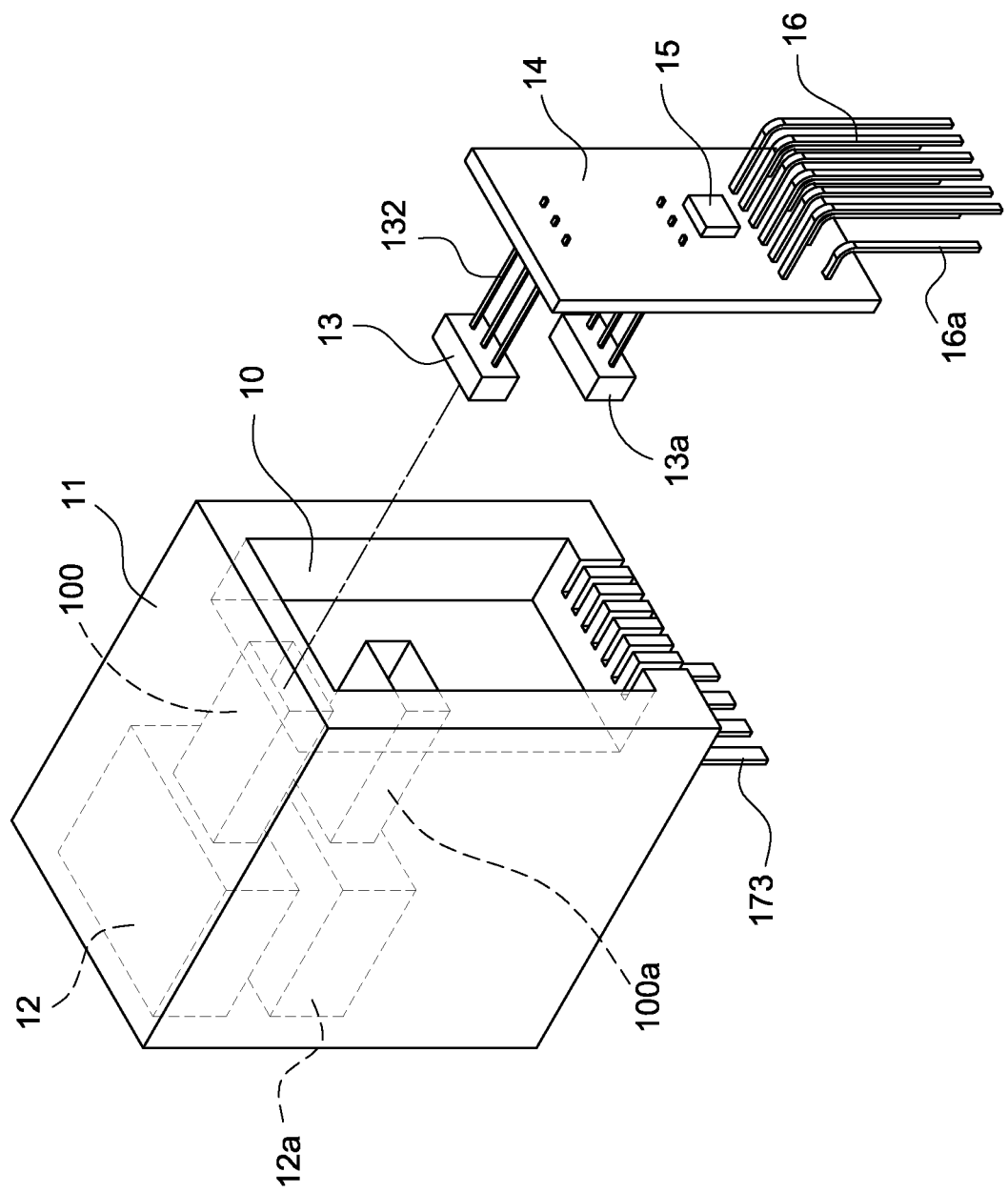
FIG. 7 is a rear view according to the third embodiment of the present invention.

FIG. 6 and FIG. 7 are respectively a front view and a rear view according to the third embodiment of the present invention. The optical connector 1 can have both the first slot 12 and the first slot 12*a*. The circuit board 14 can have both the optical component 13 and the optical component 13*a*. The signal transforming integrated circuit 15 is electrically connected to the circuit board 14 for transforming the received optical signals respectively from the optical component 13 and the optical component 13*a* into corresponding electronic signals. As FIG. 7 shows, the connecting terminals 16 and the connecting terminals 16*a* are both electrically connected to the circuit board 14 for transmitting the transformed electronic signals to the mainboard 2.

The shape of the first slot 12 corresponds to a specific format, for example a eSATA transmission interface, for connecting with a eSATA transmission line. The position of the optical receiving portion 131 of the optical component 13 corresponds to the position of the tunnel 100. The number of the connecting terminals 16 corresponds to the format of the eSATA interface. In this embodiment, the number is seven for example.

In another aspect, the shape of the first slot 12*a* corresponds to another specific format, for example a USB format for connecting a USB transmission line. The position of the optical receiving portion 131*a* corresponds to the position of a second tunnel 100*a*. The number of the connecting terminals 16*a* corresponds to the format of USB interface. In this embodiment, the number is four. The sum of the connecting terminals 16 and connecting terminals 16*a* is eleven. The connecting terminals 16 and the connecting terminals 16*a* are used for transmitting different electronic signals, such as the eSATA signal and the USB signal in this embodiment.

Figure 8:
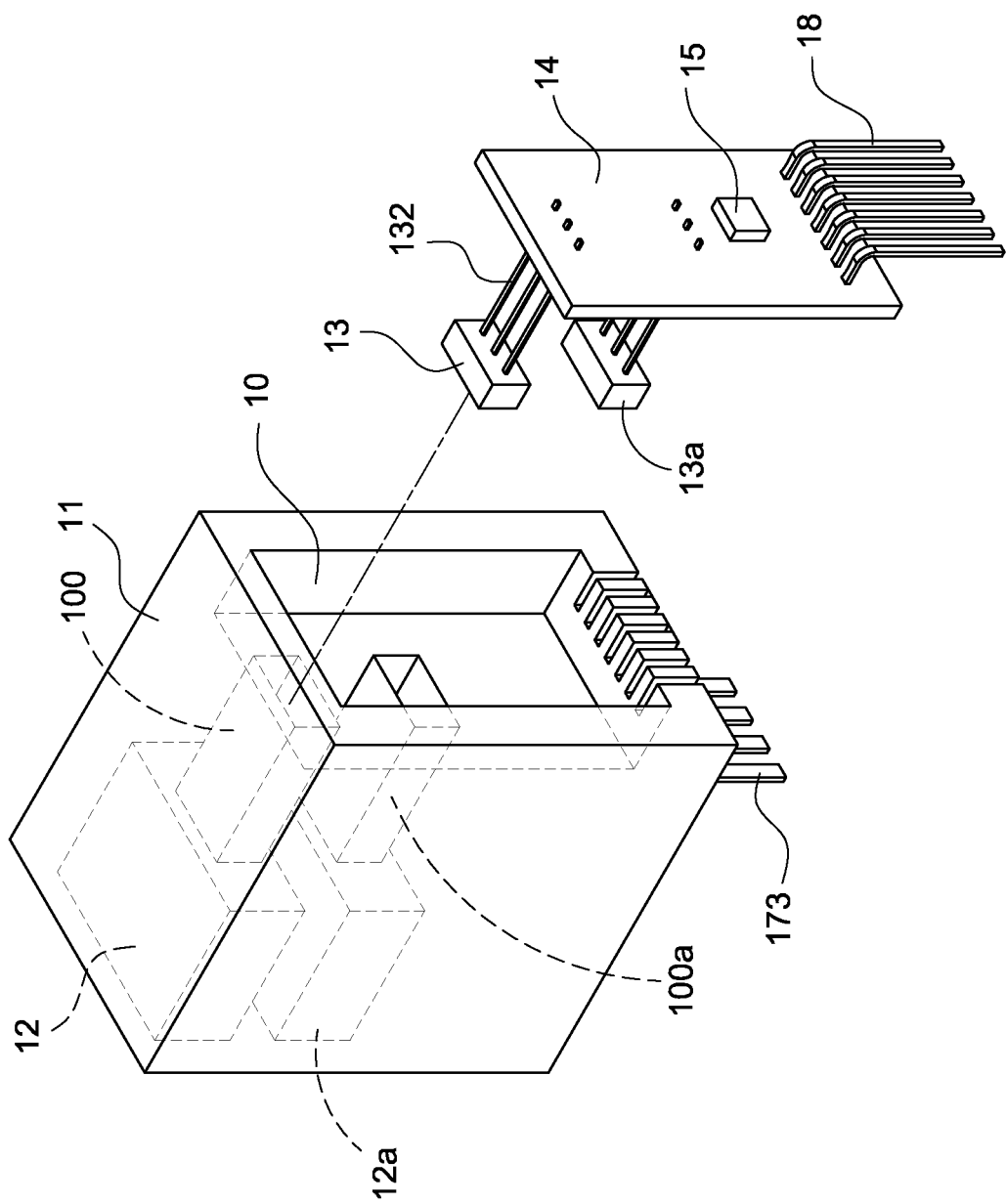
FIG. 8 is a rear view according to the fourth embodiment of the present invention.

FIG. 8 is a perspective view according to the fourth embodiment of the present invention. In this embodiment, the circuit board 14 is electrically connected with a plurality of general connecting terminals 18. Through the general connecting terminals 18, the circuit board 14 is electrically connected to the mainboard 2 for transmitting the transformed electronic signal. The difference to the above embodiment is that whatever the number of the first slot 12 and the first slot 12*a* is, and whatever format the wire is, after the signal transforming integrated circuit 15 transforms the optical signal into electronic signal, the electronic signal will be transmitted through the general connecting terminals 18 and to the mainboard 2.

For example, if there are an eSATA format first slot 12 and a USB format first slot 12a, only seven general connecting terminals 18 is needed for transmitting the transformed eSATA signal and USB signal to the mainboard 2.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An optical connector for electrically connecting to a mainboard of an external electronic device, the optical connector comprising:
   a base having at least one first slot formed on a front surface thereof, a receiving space being defined in the base, a tunnel being formed for communicating the receiving space and the first slot,
   a circuit board arranged in the receiving space;
   at least one optical component arranged in the receiving space and electrically connected to the circuit board, the optical component having an optical receiving portion, the position of the optical receiving portion corresponding to the tunnel;
   a signal transforming integrated circuit arranged in the receiving space and electrically connected to the circuit board and used for transforming the received optical signal into an electronic signal;
   a plurality of connecting terminals arranged in the receiving space, one end of each of the connecting terminals being electrically connected to the circuit board and the other end thereof protruding out from the base and electrically connecting to the mainboard for transmitting the electronic signal to the mainboard;
   wherein the first slot is used for inserting with an external wire, and the optical receiving portion of the optical component receives the optical signal from the external wire through the tunnel.

2. The optical connector as claim 1, wherein the number of the connecting terminals corresponds to the format of the external wire inserted in the first slot.

3. The optical connector as claim 2, wherein the shape of the first slot corresponds to the shape of USB transmission interface, the signal transforming integrated circuit transforms the optical signal into USB format electronic signal, the number of the connecting terminals is four.

4. The optical connector as claim 2, wherein the shape of the first slot corresponds to the shape of eSATA transmission interface, the signal transforming integrated circuit transforms the optical signal into an eSATA format electronic signal, the number of the connecting terminals is seven.

5. The optical connector as claim 2, wherein the shape of the first slot corresponds to the shape of HDMI transmission interface, the signal transforming integrated circuit transforms the optical signal into HDMI format electronic signal, the number of the connecting terminals is seven.

6. The optical connector as claim 1, wherein at least one electronic connector is arranged below the first slot.

7. The optical connector as claim 1, wherein at least one second slot is formed below the first slot, the second slot has a tongue portion and a plurality of conductive terminals arranged on the tongue portion, one ends of the conductive terminals protrude out from the base and electrically connected to the mainboard, an electronic connector is constituted by the second slot, the tongue portion and the conductive terminals.

8. The optical connector as claim 7, wherein the electronic connector is a USB connector.

9. The optical connector as claim 7, wherein the electronic connector is an eSATA connector.

10. The optical connector as claim 7, wherein the electronic connector is an HDMI connector.

* * * * *